United States Patent
Kamitani et al.

(10) Patent No.: US 10,106,458 B2
(45) Date of Patent: Oct. 23, 2018

(54) VEHICLE WINDOW GLASS AND METHOD FOR PRODUCING SAME

(71) Applicant: Nippon Sheet Glass Company, Limited, Tokyo (JP)

(72) Inventors: Kazutaka Kamitani, Nara (JP); Teruyuki Sasaki, Osaka (JP); Shinya Okamoto, Hyogo (JP); Takeshi Fujiwara, Kanagawa (JP); Yasumitsu Shirasuna, Kanagawa (JP); Yuki Watanabe, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 316 days.

(21) Appl. No.: 15/111,712

(22) PCT Filed: Jan. 16, 2015

(86) PCT No.: PCT/JP2015/000184
§ 371 (c)(1),
(2) Date: Jul. 14, 2016

(87) PCT Pub. No.: WO2015/107904
PCT Pub. Date: Jul. 23, 2015

(65) Prior Publication Data
US 2016/0326049 A1    Nov. 10, 2016

(30) Foreign Application Priority Data
Jan. 17, 2014    (JP) .................................. 2014-006765

(51) Int. Cl.
  B32B 3/10      (2006.01)
  C03C 17/42    (2006.01)
(Continued)

(52) U.S. Cl.
  CPC ................. C03C 17/42 (2013.01); B60J 1/00 (2013.01); E06B 9/24 (2013.01); B60J 1/10 (2013.01);
(Continued)

(58) Field of Classification Search
None
See application file for complete search history.

(56) References Cited

U.S. PATENT DOCUMENTS 6,416,890 B1 * 7/2002 Terneu ............... C03C 17/3417
                                                             428/701
6,636,370 B2 * 10/2003 Freeman ................... B32B 3/02
                                                             359/894

(Continued)

FOREIGN PATENT DOCUMENTS

JP    2007-167814    7/2007
JP    2007-176443    7/2007

(Continued)

Primary Examiner — Christopher M Polley
(74) Attorney, Agent, or Firm — Hamre, Schumann, Mueller & Larson, P.C.

(57) ABSTRACT

Provided is a method for producing a vehicle window glass, the method being adapted to prevent peeling-off of a functional thin film from a ceramic shielding layer without masking the ceramic shielding layer with a masking tape. This production method includes: an application step of feeding a coating liquid for forming the functional thin film onto a principal surface of a glass sheet on which the ceramic shielding layer has been formed beforehand, so as to allow the coating liquid to flow in a predetermined direction on the principal surface; and a drying step of drying the fed coating liquid. In the application step, the glass sheet is set in such a position that the predetermined direction coincides with a first direction in which the maximum length of the principal surface is 30 cm or less (rather than with a second direction in which the maximum length (Continued)

is more than 50 cm) and thus that the distance the coating liquid flows on the principal surface is limited to 30 cm or less.

12 Claims, 5 Drawing Sheets

(51) Int. Cl.
 *B60J 1/00* (2006.01)
 *E06B 9/24* (2006.01)
 *B60J 1/10* (2006.01)

(52) U.S. Cl.
 CPC .... *C03C 2217/74* (2013.01); *C03C 2218/112* (2013.01); *E06B 2009/2417* (2013.01)

(56) References Cited

U.S. PATENT DOCUMENTS

| | | | |
|---|---|---|---|
| 6,673,456 B1* | 1/2004 | Kobata | B32B 17/10174 428/323 |
| 8,367,187 B2 | 2/2013 | Muromachi et al. | |
| 8,445,096 B2 | 5/2013 | Muromachi et al. | |
| 2005/0003210 A1* | 1/2005 | Inoguchi | C03C 17/007 428/432 |
| 2005/0164014 A1* | 7/2005 | Tomonaga | C03C 17/008 428/432 |
| 2007/0036985 A1* | 2/2007 | Kamitani | C03C 17/007 428/426 |
| 2007/0224340 A1* | 9/2007 | Hatta | B32B 17/10678 427/160 |
| 2009/0007490 A1* | 1/2009 | Muromachi | B60J 3/007 49/70 |

FOREIGN PATENT DOCUMENTS

| | | |
|---|---|---|
| JP | 2007-191322 | 8/2007 |
| JP | 2011-256060 | 12/2011 |
| JP | 2013-129576 | 7/2013 |

* cited by examiner

VEHICLE WINDOW GLASS AND METHOD FOR PRODUCING SAME

TECHNICAL FIELD

The present invention relates to vehicle window glasses and particularly relates to a vehicle window glass including a functional thin film formed by a liquid phase deposition process.

BACKGROUND ART

To improve design quality of a vehicle, a ceramic shielding layer often is formed on a peripheral part of a vehicle window glass. The ceramic shielding layer serves also to prevent ultraviolet-induced degradation of resin materials such as a foam and an adhesive for joining the window glass to the vehicle body. The ceramic shielding layer is formed by applying and sintering a ceramic paste on the window glass.

In some cases, vehicle window glasses are required to have the function of shielding against ultraviolet light, for example, to prevent sunburn. Also, the function of shielding against infrared light may be desired, for example, to reduce air conditioning cooling load or sense of heat. Other functions which may be required of window glasses include water repelling function and anti-fogging function. To meet the demands for these functions, window glasses having various functional thin films formed thereon are produced. Functional thin films may be formed by a vapor phase deposition process; however, a liquid phase deposition process in which a coating liquid is fed to form a film is more suitable for mass production.

In general, a metal compound reactive with hydroxyl groups (OH groups) present on the surface of a glass sheet is added to the coating liquid. A typical example of the metal compound is a silicon compound typified by a silicon alkoxide such as tetraethoxysilane (TEOS) or a hydrolysate thereof. The metal compound reacts with hydroxyl groups on the surface of a glass sheet to fix a functional thin film on the surface of the glass sheet. Strictly speaking, silicon (Si) is not a metal atom. In the present description, however, the term "metal compound" is intended, as is conventional, to encompass silicon compounds.

The surface of the ceramic shielding layer has a smaller number of hydroxyl groups per unit area than the surface of the glass sheet. For this reason, when a functional thin film is formed to cover not only a transparent region in which the surface of the glass sheet is exposed but also the surface of the ceramic shielding layer, the functional thin film may peel off from the surface of the ceramic shielding layer. Unlike the transparent region, the shield region on which the ceramic shielding layer is formed is shielded by itself from light and view. Thus, loss or reduction of a function due to the peeling-off of the functional thin film poses no problem to the shield region. However, partial peeling-off of the functional thin film causes an aesthetic defect in the window glass.

In view of the above circumstances, when a ceramic shielding layer is present on a surface of a glass sheet on which a functional thin film is to be formed, a coating liquid is applied to the surface after masking of the ceramic shielding layer with a masking tape. Patent Literature 1 points out the problem of the occurrence of optical transmission distortion attributed to a local increase in thickness of the functional thin film caused by a coating liquid pool formed due to the attachment of a masking tape. To prevent this optical transmission distortion, Patent Literature 1 proposes adjusting the relationship between the total thickness of the masking tape and the ceramic shielding layer and the thickness of the film to be formed.

CITATION LIST

Patent Literature

Patent Literature 1: JP 2007-167814 A

SUMMARY OF INVENTION

Technical Problem

The need for the operation of attaching a masking tape significantly diminishes the efficiency of mass production that uses a liquid phase deposition process to form functional thin films. To form a functional thin film without using a masking tape to mask a ceramic shielding layer, it is desired to prevent the functional thin film from peeling off from the ceramic shielding layer. It is therefore an object of the present invention to provide a method for producing a vehicle window glass, the method being adapted to prevent peeling-off of a functional thin film from a ceramic shielding layer. Another object of the present invention is to provide a novel vehicle window glass that can be provided by the production method.

Solution to Problem

The present invention provides a method for producing a vehicle window glass including a glass sheet and a functional thin film formed on a principal surface of the glass sheet, the principal surface including a shield region provided along a periphery of the principal surface and a transparent region surrounded by the shield region, the principal surface having a maximum length of 30 cm or less as measured in a first direction and having a maximum length of more than 50 cm as measured in a second direction orthogonal to the first direction, the shield region of the principal surface having a ceramic shielding layer formed thereon, the functional thin film lying over the transparent region and the shield region, the method including:

an application step of feeding a coating liquid for forming the functional thin film onto the principal surface from a nozzle moving relative to the glass sheet, so as to allow the coating liquid to flow in a predetermined direction on the principal surface and thereby allow the coating liquid to cover a region on which the functional thin film is to be formed; and a drying step of drying the coating liquid fed onto the principal surface, wherein in the application step, the glass sheet used is a glass sheet having the ceramic shielding layer formed beforehand on the principal surface, and the glass sheet is set in such a position that the predetermined direction coincides with the first direction and thus that a distance the coating liquid flows on the principal surface is limited to 30 cm or less.

The present invention also provides a vehicle window glass including a glass sheet and a functional thin film formed on a principal surface of the glass sheet, wherein the principal surface has a shield region provided along a periphery of the principal surface and a transparent region surrounded by the shield region, has a maximum length of 30 cm or less as measured in a first direction, and has a maximum length of more than 50 cm as measured in a second direction orthogonal to the first direction, the shield region of the principal surface has a ceramic shielding layer formed thereon, the functional thin film lies over the transparent region and the shield region, the functional thin film is formed by a liquid phase deposition process on the ceramic shielding layer, and the functional thin film has a thickness increasing from one end to the other in the first direction over each of the transparent region and the shield region of the principal surface.

Advantageous Effects of Invention

The production method of the present invention is adapted to produce a vehicle window glass resistant to peeling-off of a functional thin film from a ceramic shielding layer, without masking the ceramic shielding layer with a masking tape. The vehicle window glass obtained by the production method is such that over regions in each of which the surface state is identical, i.e., over each of the transparent region and the shield region, the functional thin film has a thickness increasing from one end to the other in the first direction in which the maximum length is 30 cm or less.

DESCRIPTION OF EMBODIMENTS

Hereinafter, an embodiment of the present invention will be described with reference to the drawings. It should be noted that the present invention is not limited to the embodiment described hereinafter.

Figure 1:
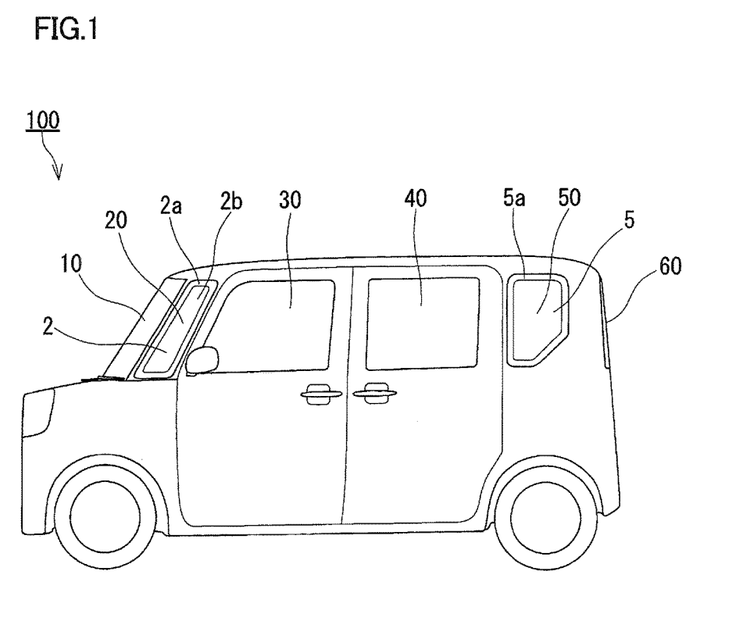
FIG. 1 is a side view showing an automobile as an exemplary vehicle.

On vehicle window glasses there may be formed various functional thin films for providing functions such as ultraviolet shielding function, infrared shielding function, antifogging function, and water repelling function. Such a functional thin film is basically formed on a window glass that is required to have the intended function. In fact, however, it is often the case that a functional film is formed on a window glass to be placed near to an occupant, particularly a driver, despite the fact that statutory regulations oblige such a window glass to have a high visible transmittance (e.g., 70% or more). There follows a description in which a small automobile 100 shown in FIG. 1 is used as an example. Window glasses mounted in a front window (windshield) 10, a front side-window 20, and a front door window 30 have a strong need for a functional thin film.

Among these window glasses, a window glass 2 mounted in the front window 10 or the front side-window 20, which are stationary windows (fixed sash windows), often has a shield region 2a provided along its entire periphery (the shield region of the windshield is not shown in the drawings). The shield region 2a is formed to surround a transparent region 2b, and a ceramic shielding layer is formed on a principal surface of the glass sheet in the region 2a. In general, the ceramic shielding layer and the functional thin film are each formed on a glass surface other than a glass surface to be exposed to the space outside the vehicle in consideration of degradation of, or physical damage to, the material forming the layer or thin film. The window glass used in the front window 10 is laminated glass including two glass sheets joined together via a resin film. Thus, the ceramic shielding layer and the functional thin film do not have to be formed on one and the same glass surface if each of them should be formed on a glass surface other than that which is to be exposed to the space outside the vehicle. For the front side-window 20 in which a single glass sheet is used, it is appropriate to form the ceramic shielding layer and the functional thin film on one and the same glass surface, particularly a glass surface to be exposed to the space inside the vehicle. Thus, the problem as discussed above, that is, the problem caused by peeling-off of the functional thin film from the ceramic shielding layer can clearly arise in window glasses, such as that of the front side-window 20, in which only one glass sheet is used.

Figure 2:
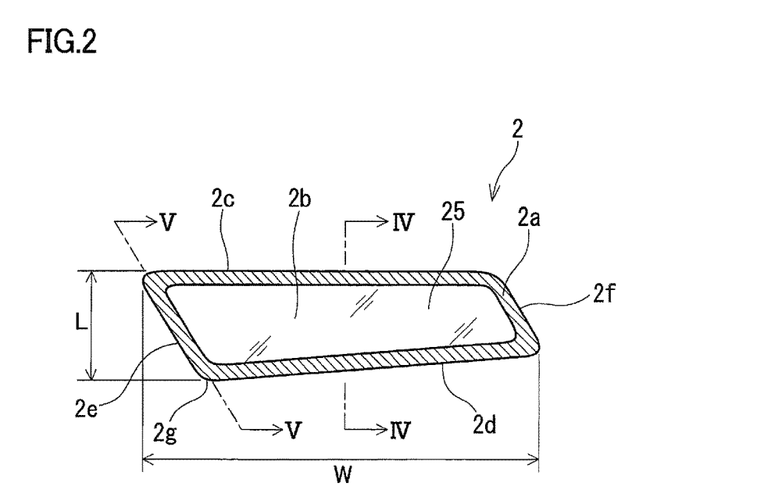
FIG. 2 is a plan view showing an embodiment of the vehicle window glass produced according to the present invention.

In general, the window glass used in the front side-window 20 is approximately trapezoidal or approximately triangular as viewed in a direction perpendicular to the principal plane of the window glass. A front side-window having a very small size does not have a strong need for the addition of a function by a functional thin film. As shown in FIG. 2, in the window glass 2 mounted in the front side-window 20 having such a large area as to create a need for various functions, the length in a vehicle height direction (the length in the left-right direction in FIG. 2) is considerably greater than the length in the front-rear direction of the vehicle. In a production site where a functional thin film is formed by liquid phase deposition on the window glass 2 having such a shape, a coating liquid is applied to a principal surface of the glass sheet, with the position of the glass sheet adjusted so as to reduce as much as possible the distance of movement of a nozzle discharging the coating liquid and thereby increase the area coated per unit time. In production of the window glass 2 shown in FIG. 2, the efficiency of mass production can be increased by: hanging a glass sheet 25 in such a position that a peripheral edge 2e, which is to form a lower edge in the vehicle, is located as an upper edge and that a peripheral edge 2d, which is to form a rear edge in the vehicle, extends in the vertical direction; and applying a coating liquid onto the thus-hung glass sheet 25 from a nozzle being moved along the peripheral edge 2e. However, a functional thin film formed by such a conventional deposition process easily undergoes local peeling-off from the surface of the ceramic shielding layer.

The peeling-off of the functional thin film becomes more marked with increasing thickness of the film. Thus, a reduction in thickness of the film as a whole can contribute to the prevention of the peeling-off of the film. However, formation of an excessively thin portion in the functional thin film is undesirable in terms of providing a desired function to the entire transparent region 2b of the window glass by the functional thin film. In general, when a functional thin film is formed by a liquid phase deposition process in which a coating liquid is allowed to flow along a principal surface of a glass sheet, the thickness of the film increases with an increase in the distance the coating liquid flows on the principal surface. Hence, in the present embodiment, the range of thickness variation of the functional thin film is limited by feeding a coating liquid onto a principal surface of a glass sheet in such a manner as not to allow the coating liquid to flow an excessively large distance on the principal surface.

Figure 3:
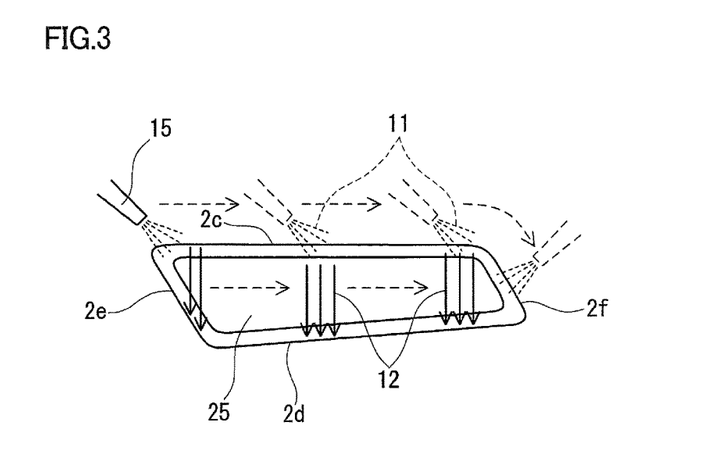
FIG. 3 is a plan view of a glass sheet for illustrating an embodiment of the production method according to the present invention.

Thus, the glass sheet 25 is held, as shown in FIG. 2 and FIG. 3, so that a coating liquid 11 does not flow an excessively long distance on a principal surface of the glass sheet 25 during feed of the coating liquid 11 from a nozzle 15. To be specific, the glass sheet 25 is hung with a non-illustrated hanging tool (such as tongs) to set the glass sheet 25 in such a position that a maximum length L of the principal surface of the glass sheet 25 in a direction 12 in which the coating liquid flows is 30 cm or less. In the illustrated embodiment, the glass sheet 25 is held in such a manner that a peripheral edge 2c, which is to form a front edge in the vehicle, is located as an upper edge in the vertical direction and that a peripheral edge 2d, which is to form a rear edge in the vehicle, is located as a lower edge in the vertical direction. The peripheral edge 2c extends horizontally (in the left-right direction in the plane of the sheet of paper). The maximum length L of the principal surface in the flow direction 12 of the coating liquid 11 (vertical direction from top to bottom in the plane of the sheet of paper) is defined as a length from the peripheral edge 2c to an end 2g that is the lowest point in the peripheral edge 2d. A maximum length W of the principal surface of the glass sheet 25 in the direction orthogonal to the flow direction 12 is set to 50 cm or more so that the glass sheet 25 is fit to the front side-window 20.

With the glass sheet 25 being held in the manner described above, the coating liquid 11 is fed to a principal surface of the window glass 2, particularly the principal surface which is to face the interior of the vehicle, from the nozzle 15 being moved along the peripheral edge 2c which is to form a front edge in the vehicle. On this principal surface there is a ceramic shielding layer formed beforehand. The nozzle 15 moves along the peripheral edge 2c, for example, in a direction from the peripheral edge 2e which is to form a lower edge in the vehicle to a peripheral edge 2f which is to form an upper edge in the vehicle and then moves downward along the peripheral edge 2f, while feeding the coating liquid 11 onto the principal surface of the glass sheet 25. The amount of the coating liquid discharged from the nozzle 15 is preferably kept constant. In the present embodiment, the feed of the coating liquid is done without masking of the ceramic shielding layer. In this way, the coating liquid 11 is fed to a region including the transparent region 2b and the shield region 2a, more particularly the entirety of the transparent region 2b and at least a part of the shield region 2a.

Some portions of the shield region 2a, such as a portion very near to the peripheral edge 2c located as an upper edge and a tiny portion in contact with the hanging tool, may not be fed with the coating liquid. By contrast, a portion of the shield region 2a that is situated downwardly of the transparent region 2b, such as a portion of the shield region that extends along the peripheral edge 2d, is fed with the coating liquid, since masking is not done. In the present embodiment, the distance the coating liquid flows is limited at most to the length L, i.e., 30 cm, even when the coating liquid is fed to the entire shield region 2a.

In the step of applying the film-forming solution, the relative humidity of the ambient atmosphere is kept preferably at less than 40%, more preferably at 30% or less. Keeping the relative humidity low can prevent the film from absorbing an excess amount of water from the ambient atmosphere. Absorption of a large amount of water from the ambient atmosphere could cause water to remain in the matrix of the film and reduce the strength of the film.

The application step of applying the coating liquid is followed by a drying step of drying the coating liquid. The step of drying the coating liquid preferably includes an air drying step and a heat drying step involving heating. It is advantageous to accomplish the air drying step by exposing the coating liquid to an atmosphere whose relative humidity is kept at less than 40% or even at 30% or less. The air drying step can be performed as a non-thermal step, i.e., can be performed at room temperature. During the heat drying step there proceeds a reaction involving a metal compound contained in the coating liquid and hydroxyl groups present on the glass surface and on the surface of the ceramic shielding layer. To be specific, for example, condensation polymerization of silanol groups formed by hydrolysis of a silicon alkoxide proceeds and, at the same time, removal of a liquid component, particularly water, remaining in the film proceeds, in association with which a matrix of silicon oxide (network of Si—O bonds) develops. The hydroxyl groups present on the surfaces bind to the periphery of the matrix to fix the film to the surfaces. This is the way in which the functional thin film is formed.

When the coating liquid contains an organic substance as a component for providing a function to the functional thin film, it is advantageous that the temperature used in the heat drying step be not excessively high so as to avoid decomposition of the organic substance. The appropriate heating temperature in this case is 300° C. or lower and, for example, 100 to 200° C.

Figure 4:
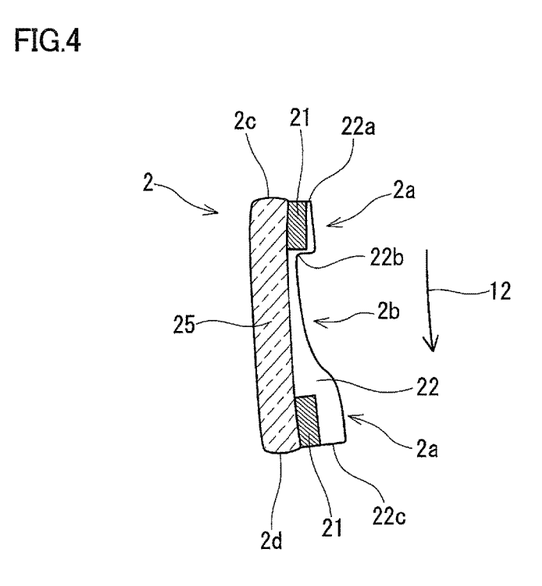
FIG. 4 is a cross-sectional view taken along the IV-IV line of FIG. 2.
Figure 5:
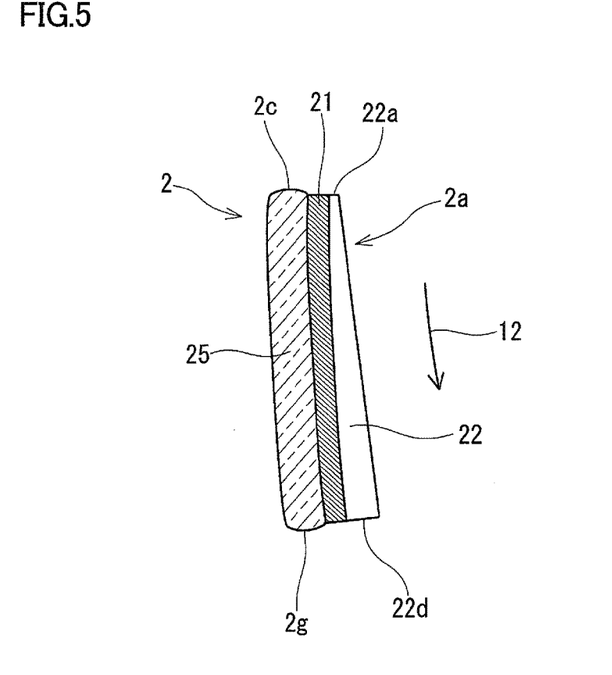
FIG. 5 is a cross-sectional view taken along the V-V line of FIG. 2.

As shown n FIG. 4 and FIG. 5, the thickness of the functional thin film 22 formed on the glass sheet 25 gradually increases in the flow direction 12 of the coating liquid (FIG. 4 and FIG. 5 show the variation in film thickness in a somewhat exaggerated manner). To be exact, the film thickness may sharply change at the boundary between the surface of the ceramic shielding layer 21 and the surface of the glass sheet 25. At least over the region 2a (or 2b) in which the surface state is identical, however, the thickness of the functional thin film 22 increases gradually and monotonically in the flow direction 12 of the coating liquid from one end 22a to the other end 22c. That is, over each of the transparent region 2b and the shield region 2a, the thickness of the functional thin film 22 increases from one end to the other in the direction (first direction) 12 in which the coating liquid flows on the principal surface. As in the case of the experimental example described later, the thickness of the functional thin film 22 may increase from one end to the other in the direction 12 over the entire principal surface.

The thickness of the functional thin film 22 is at a minimum (film thickness A) at its most upstream point (upstream end) 22a in the flow direction 12 of the coating liquid 11. It is advantageous to appropriately set the film thickness A according to the desired level of the function to be provided by the functional thin film. The film thickness A is, for example, 0.8 μm or more, preferably 1.0 μm or more, more preferably 1.5 μm or more and, in some cases, 2.0 μm or more. In general, the thickness of the functional thin film 22 is at a maximum (film thickness B) at a point 22d of the most downstream points (downstream ends) 22c and 22d in the flow direction 12, the point 22d being a point where the distance the coating liquid 11 flows on the principal surface of the glass sheet 25 is at a maximum. The film thickness B is set smaller than a minimum thickness threshold at and above which the functional thin film is likely to peel off from the ceramic shielding layer. This minimum thickness threshold differs depending on the type of the functional thin film, more particularly on the components constituting the functional thin film, which is why the preferred range of the film thickness B cannot be unambiguously specified. When the prevention of the film peeling is defined as a priority goal irrespective of the type of the film, the film thickness B should be, for example, 2.8 µm or less, preferably 2.7 µm or less, and more preferably 2.5 µm or less. Thus, a possible example of the preferred range of the thickness of the functional thin film is 0.8 to 2.8 µm.

The thickness of the functional thin film can be adjusted depending on, for example, the components, viscosity, and feed amount of the coating liquid. For example, the higher the total concentration of solid contents in the coating liquid is, the thicker the functional thin film becomes. When the thickness of the functional thin film should be in the range of 0.8 to 2.8 µm, the desired viscosity of the coating liquid is, for example, 0.0055 to 0.0072 Pa·s and particularly 0.0055 to 0.0065 Pa·s.

As described later, the minimum thickness threshold at and above which the functional thin film is likely to peel off can be raised, for example, by adding a predetermined amount or more of silane coupling agent or a specific organic polymer to the coating liquid for forming the functional thin film. In such a case, the film thickness B may be, for example, 15 µm or less, or 12 µm or less, or even 10 µm or less. When the minimum thickness threshold at and above which the functional thin film is likely to peel off is raised, the film thickness A may be, for example, 2 µm or more, preferably 2.5 µm or more, and more preferably 3 µm or more. Thus, another possible example of the preferred range of the thickness of the functional thin film is 2 to 10 µm. In an embodiment of the present invention, the peeling-off of the functional thin film is prevented even when the functional thin film has a portion having a thickness of 8.0 µm or more or even 10.0 µm or more on the ceramic shielding layer.

In conventional practice, the prevention of the peeling-off of the functional thin film by improvement of components of the coating liquid has been applied solely in a surface over which glass is exposed, i.e., the transparent region 2b. In such a case, for example, a silane coupling agent is added to form a bond between an organic component (e.g., an ultraviolet absorber) and an inorganic component in the functional thin film, i.e., between components of the film itself. No particular emphasis has hitherto been placed on the contribution of a silane coupling agent to the bonding between an organic component contained in a ceramic shielding layer and an inorganic component of a functional thin film, and this is because masking of a ceramic shielding layer has been traditionally taken for granted. Conventional practice involves the operation of attaching and detaching a masking tape even when, for example, using a coating liquid containing a silane coupling agent.

The addition of a component such as an organic polymer to a coating liquid may increase the viscosity of the coating liquid, resulting in an increase in the variation of the thickness of the functional thin film along the flow direction 12 of the coating liquid 11. Thus, even the use of a coating liquid to which has been added a component effective in prevention of film peeling may fail to prevent film peeling if the distance the coating liquid flows on the principal surface of the glass sheet 25 is too long and hence the thickness of the functional thin film is too large at the lower end of the glass sheet. The smaller the thickness variation in the transparent region is, the less the unevenness in the level of the provided function is. It is thus advantageous to limit the distance the coating liquid flows to a small distance, also when using a coating liquid to which has been added a component effective in prevention of film peeling.

The thickness of the functional thin film 22 at the most upstream point 22b of the transparent region 2b (film thickness T) is equal to or more than the film thickness A and is, for example, 0.8 µm or more. In defining the most upstream point 22b at which the film thickness T is determined, it is appropriate, as shown in FIG. 4, to exclude a portion locally thickened by the coating liquid attached to a side surface of the ceramic shielding layer 21. Thus, the functional thin film 22 has a thickness that is equal to or more than the film thickness A and equal to or less than the film thickness B and that is, for example, 0.8 to 2.8 µm or 2 to 10 µm, over the entire transparent region 2b. As is conventionally done, the coating liquid is fed in an amount at least sufficient to cover the entire transparent region 2b according to, for example, the distance the coating liquid flows in the flow direction 12. To be more specific, the coating liquid is fed in an amount sufficient to so form the functional thin film 22 that the thickness of the functional thin film 22 increases in the flow direction 12 on the principal surface of the glass sheet 25, at least over the region 2a (or 2b) in which the surface state is identical.

In order that the maximum distance the coating liquid flows on the principal surface of the glass sheet may be limited to 30 cm or less, it is advantageous, as previously described, to feed the coating liquid onto the principal surface of the glass sheet with its position being set by hanging or the like in such a manner that the coating liquid flows in a direction in which the maximum length of the principal surface is 30 cm or less. The maintenance of the position of the glass sheet may be accomplished using a holding tool having a suction cup, or may be accomplished using a supporting tool or the like to support the lower edge of the glass sheet and/or the other principal surface to which the coating liquid is not applied.

The flow direction of the coating liquid is preferably the vertical direction. Thus, when the principal surface of the glass sheet is flat, it is preferable to set the glass sheet in such a position that the first direction coincides with the vertical direction. When the principal surface is a curved surface, it is preferable to set the glass sheet in such a position that the direction of at least a part of a line extending along the first direction tangentially to the curved surface coincides with the vertical direction. When the principal surface of the glass sheet is a curved surface, it may be infeasible for the glass sheet to be in such a position that the direction (first direction) in which the coating liquid flows coincides with the vertical direction over the entire principal surface. This is the case where the coating liquid traveling along the first direction on the principal surface draws a curved trajectory. In this case, the flow direction of the coating liquid in a part of the principal surface is made to coincide with the vertical direction. The term "vertical direction" as used in the present description is intended to encompass an "approximately vertical direction" and a "substantially vertical direction". The "approximately vertical direction" refers to a direction forming an angle of 45° or less, preferably 30° or less, with the vertical line, and the "substantially vertical direction" refers to a direction forming an angle of 15° or less with the vertical line.

The maximum length L is preferably 28 cm or less and particularly preferably 25 cm or less. The maximum length W may be 60 cm or more. When the principal surface of the window glass 2 is a curved surface, the maximum lengths L and W are determined based on lengths measured along the curved surface. At the very end of the film on the side from which the application of the coating liquid is started, the film thickness may locally have a value that does not reflect the overall tendency of thickness variation. Thus, to obtain a value valid as the film thickness A at the most upstream point, it is appropriate to employ a value measured at a point 1.5 mm away from the very end of the film.

The method described above is inapplicable to a large-size window glass for which the maximum length L is invariably more than 30 cm irrespective of its position. Referring back to the automobile shown in FIG. 1, for example, the method of the present embodiment is often inapplicable to window glasses to be mounted in the front window 10 and the front door window 30 and also to window glasses to be mounted in a rear door window 40 and a rear window 60. As previously described, however, a window glass required to have a functional thin film formed on a ceramic shielding layer is often mounted in the front side-window 20, and such a window glass typically has a "slender" shape as shown in FIG. 2 and FIG. 3. The method of the present embodiment is applicable only to a limited variety of shapes of window glasses, but is effective in solving the above-discussed problem. It should be understood that the application of the method of the present embodiment is not limited only to the window glass to be mounted in the front side-window 20. For example, a window glass 5 for use in a rear side-window 50 often has along its periphery a shield region 5a having a ceramic shielding layer formed thereon, and may, depending on its shape, be an object to which the method of the present embodiment is applicable.

The function to be provided to the window glass by the functional thin film is not limited to particular ones. For example, the function is at least one selected from ultraviolet shielding function, infrared shielding function, anti-fogging function, and water repelling function. The functional thin film may be, for example, a conventional ultraviolet-shielding film, infrared-shielding film, anti-fogging film, or water-repellent film. The functional thin film may have two or more of the functions mentioned above as examples. An example of such a functional thin film is a light transmittance-controlled film containing both an ultraviolet-absorbing component and an infrared-absorbing component. It is preferable for the functional thin film to contain at least an ultraviolet-absorbing component.

Examples of the ultraviolet-absorbing component include: benzotriazole compounds such as 2-(2'-hydroxy-5'-methylphenyl)benzotriazole and 2-(2'-hydroxy-3',5'-di-t-butylphenyl)benzotriazole; benzophenone compounds such as 2,2',4,4'-tetrahydroxybenzophenone, 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); hydroxyphenyltriazine compounds such as 2-(2-hydroxy-4-octoxyphenyl)-4,6-bis(2,4-di-t-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-t-butylphenyl)-s-triazine; and cyanoacrylate compounds such as ethyl-α-cyano-β,β-diphenylacrylate and methyl-2-cyano-3-methyl-3-(p-methoxyphenyOacrylate. One ultraviolet-absorbing component may be used alone or two or more ultraviolet-absorbing components may be used in combination. The ultraviolet-absorbing component may be at least one organic coloring matter selected from a polymethine compound, an imidazoline compound, a coumarin compound, a naphthalimide compound, a perylene compound, an azo compound, an isoindolinone compound, a quinophthalone compound, and a quinoline compound. A preferred ultraviolet-absorbing component is at least one selected from a benzotriazole compound, a benzophenone compound, a hydroxyphenyltriazine compound, and a cyanoacrylate compound.

It is preferable for the coating liquid to contain at least: a component for providing such a function as mentioned above to the functional thin film; and a metal compound capable of forming chemical bonds by reacting with hydroxyl groups present on the surface to which the liquid is applied. The metal compound may be one that reacts with hydroxyl groups by itself or may be one the reaction product (e.g., hydrolysate) of which reacts with hydroxyl groups.

It is preferable for the coating liquid to contain a silane coupling agent as a part of a metal compound capable of forming chemical bonds by reacting with hydroxyl groups. The silane coupling agent may be, for example, a compound represented by the formula (1) shown below. One silane coupling agent may be used alone or two or more silane coupling agents may be used in combination.

$$R^1_m R^2_n SiX^1_{4-m-n} \quad (1)$$

In the formula (1), $R^1$ is an organic group having a reactive functional group, $R^2$ is an organic group having no reactive functional group, $X^1$ is a hydrolyzable functional group or a halogen atom, m is an integer of 1 to 3, n is an integer of 0 to 2, and m+n is 1 to 3.

The reactive functional group is, for example, at least one selected from a vinyl group, an acryloyl group, a methacryloyl group, an isocyanurate group, a ureido group, a mercapto group, a sulfide group, an isocyanate group, an epoxy group, and an amino group. The epoxy group may be a part of a glycidyl group, particularly an oxyglycidyl group. The amino group may be any of a primary amino group, a secondary amino group, and a tertiary amino group. Preferred reactive functional groups are an epoxy group and an amino group, and an epoxy group is particularly preferable. The organic group having a reactive functional group may be, for example, an organic group that acts as a reactive functional group by itself (e.g., a vinyl group) or may be, for example, an aliphatic or aromatic hydrocarbon group in which at least one hydrogen atom is substituted by a reactive functional group. Examples of the aliphatic hydrocarbon group include a linear alkyl group having 1 to 10 carbon atoms and a branched alkyl group having 3 to 10 carbon atoms. Examples of the aromatic hydrocarbon group include a phenyl group.

The organic group having no reactive functional group is, for example, an aliphatic or aromatic hydrocarbon group. Examples of the aliphatic hydrocarbon group include a linear alkyl group having 1 to 10 carbon atoms and a branched alkyl group having 3 to 10 carbon atoms. Examples of the aromatic hydrocarbon include a phenyl group.

The hydrolyzable functional group is, for example, at least one selected from an alkoxy group, an acetoxy group, and an alkenyloxy group. Examples of the alkoxy group include an alkoxy group having 1 to 4 carbon atoms (such as a methoxy group, an ethoxy group, a propoxy group, and a butoxy group). A preferred hydrolyzable functional group is an alkoxy group. The halogen atom is, for example, chlorine or bromine, and is preferably chlorine.

The integer m is preferably 1 or 2, n is preferably 0 or 1, and m +n is preferably 1 or 2.

Examples of the silane coupling agent include vinyltriethoxysilane, p-styryltrimethoxysilane, 3-glycidoxypropyltrimethoxysilane, 3-glycidoxypropylmethyldiethoxysilane, 3-methacryloxypropyltrimethoxysilane, 3-aminopropyltrimethoxysilane, 3-aminopropyltriethoxysilane, N-phenyl-3-aminopropyltrimethoxysilane, tris-(trimethoxysilylpropyl)isocyanurate, 3-ureidopropyltrimethoxysilane, and 3-mercaptopropyltrimethoxysilane.

It is preferable for the silane coupling agent to be contained in such an amount that a mass p of a component formed by hydrolysis and condensation polymerization of the hydrolyzable group of the silane coupling agent is 20% or more of the sum (p+q) of the mass p and a mass q of a silica ($SiO_2$) component formed from a silicon-containing compound contained in the coating liquid. The use of the coating liquid containing such an amount of the silane coupling agent further reduces the occurrence of peeling-off of the functional thin film from the ceramic shielding layer. The contribution of the silane coupling agent to the prevention of peeling-off of the functional thin film from the ceramic shielding layer can be attributed to involvement of the hydrolyzable group in bonding with an inorganic component of the functional thin film and involvement of the reactive functional group in bonding with an organic component contained in the ceramic shielding layer.

The term "hydrolyzable group" as used herein is intended to encompass a hydrolyzable functional group and a halogen atom. The term "silica component" does not encompass any component containing a silicon atom directly bonded to an organic group.

The component formed by hydrolysis and condensation polymerization of the hydrolyzable group of the silane coupling agent represented by the formula (1) can be represented by the following formula (2).

$$R^1_m R^2_n SiO_{(4-m-n)/2} \quad (2)$$

Here, $R^1$, $R^2$, m, and n are as defined above.

The silicon-containing compound from which a silica component is formed contains a silicon atom bonded to four hydrolyzable groups as specifically shown in the following formula (3).

$$SiX^2_4 \quad (3)$$

In the formula (3), $X^2$ is a hydrolyzable functional group or a halogen atom, and specific examples of $X^2$ are the same as those of $X^1$. An example of this silicon-containing compound is tetraalkoxysilane. Also here, the alkoxy group is preferably an alkoxy group having 1 to 4 carbon atoms.

A ratio represented by p/(p+q) is preferably 10% or more, more preferably 25% or more, and particularly preferably 40% or more. This ratio is preferably 80% or less, more preferably 70% or less, and particularly preferably 60% or less.

It is preferable for the coating liquid to contain a polyepoxide as an organic polymer. The use of the coating liquid containing a polyepoxide further reduces the occurrence of peeling-off of the functional thin film from the ceramic shielding layer. The average number of epoxy groups in molecules of the polyepoxide may be 2 to 10. The epoxy groups contained in the polyepoxide are considered to involve in bonding with an organic component contained in the ceramic shielding layer. It is preferable for the coating liquid to contain both a silane coupling agent and a polyepoxide. The term "polyepoxide" is intended to collectively refer to any compounds having two or more epoxy groups.

Examples of the polyepoxide include polyglycidyl compounds such as polyglycidyl ether compounds, polyglycidyl ester compounds, and polyglycidyl amine compounds. The polyepoxide may be either an aliphatic polyepoxide or an aromatic polyepoxide. Preferred is an aliphatic polyepoxide. A preferred polyepoxide is a polyglycidyl ether compound, particularly an aliphatic polyglycidyl ether compound. The polyglycidyl ether compound is preferably a glycidyl ether of an alcohol having two or more hydroxyl groups. The alcohol is preferably an aliphatic alcohol, an alicyclic alcohol, or a sugar alcohol.

Examples of the glycidyl ether of an alcohol having two or more hydroxyl groups include ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, diglycerol polyglycidyl ether, polyglycerol polyglycidyl ether, trimethylolpropane polyglycidyl ether, sorbitol polyglycidyl ether, and pentaerythritol polyglycidyl ether. These may be used alone or two or more thereof may be used in combination.

Among these examples, polyglycidyl ethers (in which the average number of glycidyl groups (epoxy groups) is more than 2 per molecule) of aliphatic polyols having three or more hydroxyl groups, such as glycerol polyglycidyl ether, diglycerol polyglycidyl ether, polyglycerol polyglycidyl ether, and sorbitol polyglycidyl ether, are preferable in terms of reducing the occurrence of peeling-off of the functional thin film.

It is preferable for the polyepoxide to be contained in such an amount that a mass s of the polyepoxide is 1% or more of a mass t of a component formed by hydrolysis and condensation polymerization of the hydrolyzable group of the silicon-containing compound in the coating liquid. A component formed by hydrolysis and condensation polymerization of the hydrolyzable group of the silane coupling agent represented by the formula (1) is as represented by the formula (2), and the mass of the component is defined above as p. A component formed by hydrolysis and condensation polymerization of the silicon-containing compound represented by the formula (3) is $SiO_2$, and its mass is defined above as q. Thus, when the silicon-containing compound in the coating liquid consists of the silane coupling agent represented by the formula (1) and the silicon-containing compound represented by the formula (3), the mass t is equal to the mass (p+q).

A ratio represented by s/t is preferably 1% or more, more preferably 1.5% or more, and particularly preferably 2% or more. This ratio is preferably 10% or less, more preferably 7% or less, and particularly preferably 5% or less.

Improving components of the coating liquid as described above can prevent peeling-off of the functional thin film. The functional thin film can be formed by a liquid phase deposition process using, for example, a coating liquid that contains a silane coupling agent and that may preferably further contain a polyepoxide. The prevention of peeling-off of the functional thin film is possible even when the maximum thickness of the film is more than 8.0 μm or even more than 10.0 μm.

With the use of the present invention, it is also possible to provide a vehicle window glass having a functional thin film that does not peel off from the glass sheet when subjected to Taber abrasion test according to Japanese Industrial Standards (JIS) R 3212, particularly a vehicle window glass having a functional thin film that does not peel off even from a ceramic shielding layer when subjected to the test.

There is no particular limitation on the glass sheet and the ceramic shielding layer, and they may be formed using well-known materials or hitherto-known methods.

The following will describe an experimental example in which the thickness variation of a functional thin film was measured versus the distance a coating liquid flowed. In this example, an ultraviolet-shielding film was prepared as the functional thin film.

EXPERIMENTAL EXAMPLE

There was prepared 39.4 g of a coating liquid (concentration of solid contents=3.6 weight%) containing: 0.45 g of polyethylene glycol (manufactured by KISHIDA CHEMICAL Co., Ltd.); 12.6 g of ethyl alcohol (manufactured by KATAYAMA CHEMICAL INDUSTRIES Co., Ltd.); 17.2 g of pure water; 0.025 g of concentrated hydrochloric acid (manufactured by KANTO CHEMICAL CO., INC.; 35 mass %); 0.64 g of 3-glycidoxypropyltrimethoxysilane (manufactured by Shin-Etsu Chemical Co., Ltd., a silane coupling agent) and 29.7 g of tetraethoxysilane (TEOS; manufactured by Shin-Etsu Chemical Co., Ltd.) as a solute; and a benzotriazole-based ultraviolet absorber ("TINUVIN 360" manufactured by Ciba Specialty Chemicals Inc.) as a dispersoid. The viscosity of this coating liquid was 0.006 Pa·s. The benzotriazole-based ultraviolet absorber used was one prepared beforehand by crushing performed in the presence of zirconia beads together with the use of a paint conditioner to achieve an average particle diameter of 55 nm. For the obtained coating liquid, the p/(p+q) is calculated to be 0.05 (5%).

A flat soda lime silicate glass sheet (UV protection green glass manufactured by Nippon Sheet Glass Co. Ltd., having the shape of a 450 mm (long side)×400 mm (short side) rectangle, and having a thickness of 3.1 mm) was prepared. On one principal surface of this glass sheet there is a 120 mm-wide black ceramic shielding layer formed along the periphery of the surface, and the shield region made non-transparent by this layer surrounds a central transparent region. This glass sheet was washed, and was then hung using two hanging tools in such a manner that the long sides extended in the horizontal direction and the short sides extended in the vertical direction.

Subsequently, the coating liquid was sprayed onto the principal surface of the glass sheet using a nozzle. The feed of the coating liquid was done with the nozzle being moved along the upper long side of the glass sheet. The coating liquid was not fed to portions at which the glass sheet was hung by the hanging tools but fed to the area between the two hanging tools. The coating liquid fed to the upper edge of the principal surface of the glass sheet flowed downward and dropped down from the lower edge of the glass sheet. The glass sheet was dried as such for 5 minutes, was then put in an oven having an internal temperature preliminarily adjusted to 200° C., and was heated for 15 minutes. Thus, a window glass having an ultraviolet-shielding film formed on both a ceramic shielding layer and a glass surface was obtained.

The thickness of the ultraviolet-shielding film formed on the surface of the glass sheet was measured using a surface profilometer, Alpha-Step 500, manufactured by KLA-Tencor Corporation. The result is shown in Table 1. The distances listed in Table 1 are those that the coating liquid flowed on the principal surface of the glass sheet. In this experimental example, the distances are equal to those from the upper edge of the glass sheet. The distance of 122 mm corresponds to the most upstream point of the transparent region in the flow direction of the coating liquid. In view of the fact that, as previously described, the film thickness at the very end of the film on the side from which the application of the coating liquid is started may have a value deviating from the overall tendency, a value measured at a point corresponding to a distance of 1.5 mm was employed as the film thickness A at the most upstream point.

Taber abrasion test according to JIS R 3212 was carried out as a peel test on the window glass obtained as above. This peel test can be performed using a commercially-available Taber abrasion tester. As specified in the JIS standard, this test is an abrasion test performed at 1000 rotations under the application of a load of 500 g weight. The result is shown in Table 1.

TABLE 1

| Distance (mm) | 1.5 (C) | 60 (C) | 118 (C) | 122 (G) | 180 (G) | 240 (G) | 300 (C) | 360 (C) | 400 (C) |
|---|---|---|---|---|---|---|---|---|---|
| Film thickness FT (μm) | 2.03 FT: A | 2.17 | 2.31 | 2.32 FT: T | 2.45 | 2.59 | 2.73 FT: B1 | 2.86 | 2.96 FT: B2 |
| Peel test | Good | Good | Good | Good | Good | Good | Good | Poor | Poor |

\* "(C)" indicates that the film lay on the surface of the ceramic shielding layer, while "(G)" indicates that the film lay on the glass surface.
\* "Good" indicates that no peeling was observed, while "Poor" indicates that the film partially peeled off.

The peel test of the experimental example gave the result that the ultraviolet-shielding film partially peeled off at portions for which the distance the coating liquid flowed on the principal surface of the glass sheet was more than 30 cm. By contrast, no peeling-off of the ultraviolet-shielding film was observed at portions for which the distance the coating liquid flowed on the principal surface of the glass sheet was 30 cm or less.

Example 1

A flat soda lime silicate glass sheet (UV protection green glass manufactured by Nippon Sheet Glass Co. Ltd., having the shape of a 450 mm (long side)×300 mm (short side) rectangle, and having a thickness of 3.1 mm) was prepared. On one principal surface of this glass sheet there is a 120 mm-wide black ceramic shielding layer formed along the periphery of the surface, and the shield region made non-transparent by this layer surrounds a central transparent region. In the same manner as in the experimental example except for using this glass sheet, a window glass having an ultraviolet-shielding film formed on both a ceramic shielding layer and a glass surface was obtained. The window glass obtained was subjected to Taber abrasion test in the same manner as in the experimental example. No peeling-off of the ultraviolet-shielding film was observed over the entire window glass. The thickness of the ultraviolet-shielding film was in the range of 2.0 to 2.8 μm.

Example 2

There was prepared 100 g of a coating liquid containing 1.5 g of a benzophenone-based ultraviolet absorber ("Uvinul 3050" manufactured by BASF), 42.334 g of an industrial alcohol ("P-7" manufactured by Daishin-Chemical, Co., Ltd.), 0.040 g of a silicone-based surfactant ("BYK-345", manufactured by BYK-Chemie GmbH), 11.264 g of 3-glycidoxypropyltrimethoxysilane (manufactured by Shin-Etsu Chemical Co., Ltd.) as a silane coupling agent, 22.656 g of tetraethoxysilane (manufactured by Shin-Etsu Chemical Co., Ltd.), 0.435 g of sorbitol polyglycidyl ether ("SR-SEP" manufactured by SAKAMOTO YAKUHIN KOGYO CO., LTD.), 0.025 g of para-toluenesulfonic acid monohydrate (manufactured by KANTO CHEMICAL CO., INC.), and 21.746 g of pure water.

For the obtained coating liquid, the p/(p+q) is calculated to be 0.55 (55%). For the obtained coating liquid, the s/t is calculated to be 0.03 (3%).

In the same manner as in the experimental example except for using this coating liquid and the glass sheet as used in Example 1, a window glass having an ultraviolet-shielding film formed on both a ceramic shielding layer and a glass surface was obtained. The window glass obtained was subjected to Taber abrasion test in the same manner as in the experimental example. No peeling-off of the ultraviolet-shielding film was observed over the entire window glass. The thickness of the ultraviolet-shielding film was in the range of 3 to 5 μm.

Example 3

There was prepared a coating liquid in which the total concentration of solid components was higher than in the coating liquid of Example 2 and in which the content ratio between the solid components was the same as in the coating liquid of Example 2. In the same manner as in the experimental example except for using this coating liquid and the glass sheet as used in Example 1, a window glass having an ultraviolet-shielding film formed on both a ceramic shielding layer and a glass surface was obtained. The window glass obtained was subjected to Taber abrasion test in the same manner as in the experimental example. No peeling-off of the ultraviolet-shielding film was observed over the entire window glass. The maximum value of the thickness of the ultraviolet-shielding film of the obtained window glass was about 10.0 μm.

INDUSTRIAL APPLICABILITY

The present invention is greatly beneficial in production of window glasses for various vehicles such as automobiles.

The invention claimed is:

1. A method for producing a vehicle window glass including a glass sheet and a functional thin film formed on a principal surface of the glass sheet,
the principal surface including a shield region provided along a periphery of the principal surface and a transparent region surrounded by the shield region, the principal surface having a maximum length of 30 cm or less as measured in a first direction and having a maximum length of more than 50 cm as measured in a second direction orthogonal to the first direction,
the shield region of the principal surface having a ceramic shielding layer formed thereon,
the functional thin film lying over the transparent region and the shield region,
the method comprising:
an application step of feeding a coating liquid for forming the functional thin film onto the principal surface from a nozzle moving relative to the glass sheet, so as to allow the coating liquid to flow in a predetermined direction on the principal surface and thereby allow the coating liquid to cover a region on which the functional thin film is to be formed; and
a drying step of drying the coating liquid fed onto the principal surface, wherein
in the application step,
the glass sheet used is a glass sheet having the ceramic shielding layer formed beforehand on the principal surface, and
the glass sheet is set in such a position that the predetermined direction coincides with the first direction and thus that a distance the coating liquid flows on the principal surface is limited to 30 cm or less.

2. The method for producing a vehicle window glass according to claim 1, wherein a thickness of the functional thin film is in the range of 0.8 to 2.8 μm.

3. The method for producing a vehicle window glass according to claim 1, wherein the coating liquid contains a silane coupling agent, and a mass p of a component formed by hydrolysis and condensation polymerization of a hydrolyzable group of the silane coupling agent is 20% or more of a sum (p+q) of the mass p and a mass q of a $SiO_2$ component formed from a silicon-containing compound contained in the coating liquid.

4. The method for producing a vehicle window glass according to claim 3, wherein the coating liquid further contains a polyepoxide.

5. The method for producing a vehicle window glass according to claim 1, wherein a maximum thickness of the functional thin film is more than 8.0 μm.

6. The method for producing a vehicle window glass according to claim 1, wherein the coating liquid contains an ultraviolet-absorbing component.

7. A vehicle window glass, comprising a glass sheet and a functional thin film formed on a principal surface of the glass sheet, wherein
the principal surface has a shield region provided along a periphery of the principal surface and a transparent region surrounded by the shield region, has a maximum length of 30 cm or less as measured in a first direction, and has a maximum length of more than 50 cm as measured in a second direction orthogonal to the first direction,
the shield region of the principal surface has a ceramic shielding layer formed thereon,
the functional thin film lies over the transparent region and the shield region,
the functional thin film is formed by a liquid phase deposition process on the ceramic shielding layer, and
the functional thin film has a thickness increasing from one end to the other in the first direction over each of the transparent region and the shield region of the principal surface.

8. The vehicle window glass according to claim 7, wherein the thickness of the functional thin film is in the range of 0.8 to 2.8 μm.

9. The vehicle window glass according to claim 7, wherein the functional thin film is formed by a liquid phase deposition process using a coating liquid containing a silane coupling agent.

10. The vehicle window glass according to claim 9, wherein the coating liquid further contains a polyepoxide.

11. The vehicle window glass according to claim 7, wherein a maximum thickness of the functional thin film is more than 8.0 μm.

12. The vehicle window glass according to claim 7, wherein the functional thin film contains an ultraviolet-absorbing component.

\* \* \* \* \*